(12) United States Patent
Novokhatskiy

(10) Patent No.: US 11,462,129 B2
(45) Date of Patent: Oct. 4, 2022

(54) SURGICAL SIMULATOR

(71) Applicant: UNIVERSITÄT DUISBURG-ESSEN, Essen (DE)

(72) Inventor: Ivan Novokhatskiy, Essen (DE)

(73) Assignee: UNIVERSITÄT DUISBURG-ESSEN, Essen (DE)

(*) Notice: Subject to any disclaimer, the term of this patent is extended or adjusted under 35 U.S.C. 154(b) by 864 days.

(21) Appl. No.: 16/331,075

(22) PCT Filed: Sep. 6, 2017

(86) PCT No.: PCT/DE2017/100747
§ 371 (c)(1),
(2) Date: Mar. 6, 2019

(87) PCT Pub. No.: WO2018/046061
PCT Pub. Date: Mar. 15, 2018

(65) Prior Publication Data
US 2019/0206282 A1   Jul. 4, 2019

(30) Foreign Application Priority Data
Sep. 6, 2016   (DE) ............... 10 2016 116 677.4

(51) Int. Cl.
*G09B 23/28* (2006.01)
*G09B 23/30* (2006.01)

(52) U.S. Cl.
CPC ............ *G09B 23/30* (2013.01); *G09B 23/28* (2013.01); *G09B 23/285* (2013.01)

(58) Field of Classification Search
CPC ........ G09B 23/28; G09B 23/30; A63H 33/00; A63H 33/10; A63H 33/107
(Continued)

(56) References Cited

U.S. PATENT DOCUMENTS 3,881,266 A * 5/1975 Finebloom ............... D06C 3/08
                                                      38/102.4
4,834,089 A    5/1989 Koivukangas et al.
(Continued)

FOREIGN PATENT DOCUMENTS

DE    3234875 A1    3/1984
DE    9003733 U1    7/1990
(Continued)

OTHER PUBLICATIONS

International Search Report and Written Opinion of the International Searching Authority for International Application No. PCT/DE2017/100747 dated Nov. 28, 2017.
(Continued)

*Primary Examiner* — Kurt Fernstrom
(74) *Attorney, Agent, or Firm* — Heslin Rothenberg Farley & Mesiti P.C.

(57) ABSTRACT

A surgical simulator having at least two holding elements on a support surface, wherein a bore for receiving a bearing pin is present laterally on the holding elements at least one location, and at least one bow is arranged coaxially with respect to the bearing pin which extends on a circular or rectangular line about the support surface, wherein, by a coaxial movement of the bow about the circular or rectangular line, a work field of variable size can be adjusted, and, by the movement of the bow as frame element on the holding elements, the support surface can be spanned in an arc shape, and the use of such a surgical simulator for medical and veterinary training purposes.

17 Claims, 8 Drawing Sheets

Figure 1:
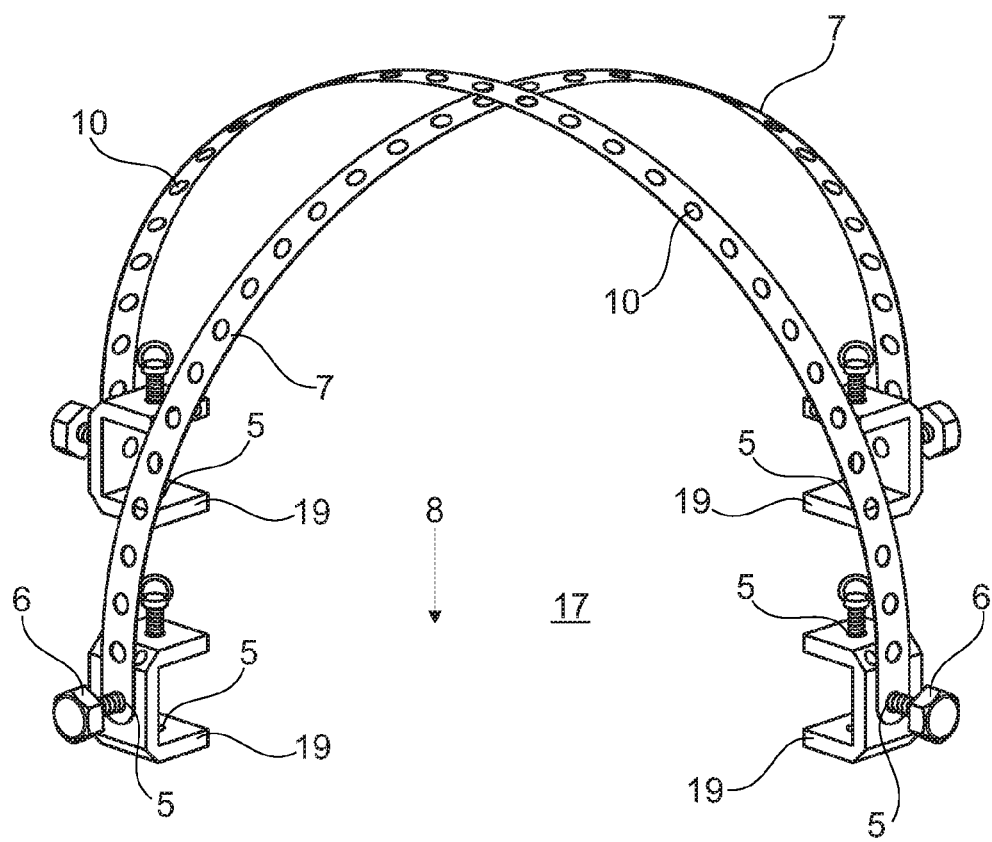

(58) Field of Classification Search
USPC .......................................................... 434/262
See application file for complete search history.

(56) References Cited

U.S. PATENT DOCUMENTS

| | | | | |
|---|---|---|---|---|
| 5,403,191 | A | 4/1995 | Tuason | |
| 6,077,221 | A * | 6/2000 | Fowler, Jr. | A61B 17/0293 600/233 |
| 6,190,312 | B1 * | 2/2001 | Fowler, Jr. | A61B 17/0293 600/233 |
| 6,932,765 | B2 * | 8/2005 | Berg | A61B 17/0293 600/233 |
| 10,675,099 | B2 * | 6/2020 | Nakamura | A61B 90/11 |
| 10,710,249 | B2 * | 7/2020 | Wang | B25J 9/0009 |
| 2012/0115117 | A1 * | 5/2012 | Marshall | G09B 23/28 434/262 |
| 2014/0349265 | A1 | 11/2014 | Park et al. | |
| 2017/0014200 | A1 * | 1/2017 | Onuma | A61B 18/1477 |
| 2017/0243522 | A1 * | 8/2017 | Feins | G09B 23/285 |
| 2017/0330485 | A1 * | 11/2017 | Singh | A61B 17/17 |
| 2019/0389054 | A1 * | 12/2019 | Zhao | B25J 17/0283 |

FOREIGN PATENT DOCUMENTS

| | | |
|---|---|---|
| DE | 4117357 A1 | 12/1992 |
| EP | 0543424 A2 | 5/1993 |
| JP | 2001005378 A | 1/2001 |

OTHER PUBLICATIONS

Terrance Walsh, "Customer Review", XP055425172, pp. 1-2 (2016), Retrieved from the Internet: URL:https://www.amazon.com/gp/customer-reviews/R3TMCV08I1EGJ0/ref=cm_cr_dp_d_rvw_ttl?ie=UTF8&ASIN=B018RLY6B2.

Anonymous, "eitech C1101 Flachstabe in HERfast Shop", pp. 1-3 (2016), Retrieved from the Internet: URL:https://web.archive.org/web/20160325092432/http://www.herfast.de/Eitech-Matallbakasten/Zuberhoer-38/Eitech-C101-Flachstaebe-11-25-Luch-Winkel.html.

Ivan Novokhatskiy et al., "Abstractsammlung Internationales SkillsLab Symposium 2016", pp. 1-2, 38 (2016), Retrieved fom the Internet: URL:https://www.uni-due.de/ht0209/isls2016/wp-content/uploads/2016/03/isls2016_abstractsammlung.pdf.

* cited by examiner

SURGICAL SIMULATOR

CROSS REFERENCE TO RELATED APPLICATIONS

This application is a national stage filing under 35 U.S.C. § 371 of International Application No. PCT/DE2017/100747, filed on Sep. 6, 2017, published as WO 2018/046061 on Mar. 15, 2018, and claims priority to German Patent Application No. 10 2016 116 677.4, filed on Sep. 6, 2016. The entire disclosures of each of the said applications are incorporated by reference in their entireties herein.

The invention relates to a surgical simulation apparatus comprising at least two holding elements on a support surface, wherein, laterally on the holding elements, at at least one site, a bore for receiving a bearing pin is present and, coaxially to the bearing pin which extends on a circular or rectangular line around the support surface, at least one hoop is arranged, wherein, due to a coaxial movement of the hoop around the circular or rectangular line, the support surface can be spanned in the form of an arc, and to the use of such a surgical simulation apparatus for medical training purposes.

The manual skills of surgeons remain essential for the success of the treatment even today, in spite of the rapid development of science and technology. Errors in surgical technique can lead to complications and even result in the death of patients. The most important basic skills in surgery, such as correct suturing and knotting techniques, can be practiced on isolated artificial and animal organs.

Thus, DE 411 73 57 A1 describes a clamping and holding device for human bones, in particular petrous bones, with a cantilever, on the outer ends of which a chuck with chuck jaws that can be moved relative to one another is attached.

Moreover, in US 2014/0349265 A1, a surgical simulation apparatus is disclosed, which comprises a housing with a partially present recess, on which, laterally at at least two sites, bores for receiving bearing pins are present, around which the cover plates are guided coaxially. Due to the coaxial arrangement of the cover plates around the bearing pins, a work field of variable size can be adjusted.

JP 2001-005378 A1 discloses a surgical simulation apparatus comprising a housing with cover plate and an opening present in the cover plate, wherein the margins of the cover plate are fastened via bearing pins to the housing. Inside the housing, medical preparations can be arranged, in order to simulate, with the aid of surgical tools, operation and treatment methods.

U.S. Pat. No. 5,403,191 A describes a surgical simulation apparatus, wherein hoop-like mirrors which can be tilted to the side and which are held in bearing pins are attached laterally on a housing. By swinging the mirror in or out in the opening of the housing, a work field of variable size can be generated.

Furthermore, in EP 054 34 24 A2, a method and a device for carrying out experimental eye operations are disclosed, in which an eye that has been cut open on the posterior side is clamped into an eye holder and illuminated using one or more illumination sources. One or more video cameras are here directed from the posterior side of the cut-open eye into the interior of the eye, in order to visualize on the video screen the instrument movements in the interior of the eye for a surgeon who is operating from the anterior side of the eye.

However, the devices known from the prior art are monofunctional, i.e., they do not cover the entire training spectrum for a surgeon. This is in part also due to the fact that the training exercises are limited by the size of the training device and of the work field.

Therefore, the aim of the invention is the development of a surgical device for training purposes, which promotes and improves the surgical skill, the operative methodology and the visual judgment of the surgeon, and which enables an organ and tissue fixation oriented toward the needs of the respective operation procedure.

The aim is achieved according to the invention in that, by means of a swiveling movement of at least one hoop as frame element on holding elements, a work field of variable size can be adjusted. The support surface is enclosed at least partially by the holding elements, and, by means of the at least one swivelable hoop over the support surface as frame element, a variable work field is obtained.

The surgical simulation apparatus according to the invention comprises, in its basic structure, a support surface which is used as substrate for an operation area or a work field. Here, the support surface can represent a table surface or a treatment support as used in operating rooms, or a preformed support as base plate and/or work plate. The design of the support surface can be circular, ellipsoid, rectangular or polygonal. Any materials can be used for the support surface, provided that the materials take into account the requirements for the practical performance of a simulated operation course. In particular, the support surface can consist of metal, stone, glass or plastic or it can comprise a combination of these materials.

Laterally on the support surface, at least two holding elements are located. According to the invention, holding elements are understood to mean device components having at least one bore in which a bearing pin is arranged and via which at least one hoop is guided. The holding elements can be independent components or else be part of an overall unit such as, for example, elements of a base plate and/or work plate. According to the invention, a hoop is understood to mean a curved frame element which spans the space above the support surface or the work field and which can enclose or delimit the area between work field and frame element as a surgical simulation space in a variable manner by coaxial movement along a circular or rectangular line. The term curved frame element here includes both semi-circular and rectangular structures having a radial diameter in a range from 0.5 cm to 5 cm. The length of the hoops and thus also the size of the work field are variable. The length of the hoop as a rule is between 5 cm and 50 cm, preferably 25 cm, particularly preferably 10 cm. The hoop lengths can also be different on different holding element pairs. Thus, the hoops on one holding element pair, which comprise facing or mutually adjoining holding elements with at least one bore, a respective bearing pin and at least one hoop, can vary in terms of their length and/or width in comparison to other holding element pairs. The hoops are here arranged in such a manner that at least one hoop is fastened to at least two holding elements, i.e., that at least one hoop is guided in each case via at least one bearing pin on at least two holding elements. The hoops on all the holding elements can also have the same dimensions and extents in terms of form, diameter and length.

The term coaxial movement or swiveling means that at least one hoop can be guided along a circular or rectangular line on in each case two holding elements. Since it is possible to move the hoops by rotation into the plane of the support surface or the work field or to deflect them out of said plane, a portion of the support surface can be spanned as work field as a function of the length and curvature of the hoops and the rotation. The area of the support surface which can be covered at least partially by the hoops during the coaxial movement is defined as the work field lying underneath.

If two hoops are guided via two mutually facing bearing pins of the holding elements, then the area lying between the hoops can be generated as work field by swiveling the hoops, i.e., the work field or the work area can be increased or decreased, depending on how far the hoops are rotated with respect to one another. If additional holding elements are fastened to the support surface, then, for example, when four holding elements are present and the holding elements are in each case arranged with 90° offset with respect to one another, during a swiveling movement of in each case two hoops on a holding element pair by in each case 45° toward the center of the support surface, the work field can be further subdivided in that a diamond-shaped space or a diamond-shaped surface between the mutually orthogonally arranged holding elements under the hoops is obtained as work field. The area between the hoops can be variably increased or decreased, depending on how far the hoops are rotated with respect to one another. However, it is also conceivable to use three, five, six or more holding elements which assume a relative distance from one another of 120°, 72°, 60°, etc., for example. The advantage of the variably settable size of the work field or work area is that, depending on the medical indication or the operation technique to be used, a corresponding size of the operation area as work field can be obtained using a different number of holding elements. Thus, it may be necessary to fasten two, three or more hoops to the holding elements, depending on which task definition requires a subdivision or a building up of the work field. However, it is also possible to use the support surface as work field without subdivision by the hoops or to leave the hoops in the plane of the support surface or the work field, i.e., not to carry out a relative movement of the hoops with respect to one another. Thus, in the case of one or more hoops arranged on two identical holding elements and concentrically guided with one another, it should also be possible not to achieve an increase or decrease of the work field or the work area. In such a case, the curved hoop(s) can span the support surface in the case of a rotation as frame element and define, as work field, the area which lies under the hoops and which is radially delimited by the course of the hoops on a circular or rectangular line.

The holding elements can be connected by non-positive connection to the support surface and the holding elements, wherein the holding elements can be fixed by screw or clamp connection to the support surface. The holding elements can be designed to be c-shaped or clamp-shaped in a subsection. For example, but not exhaustively, the holding elements can be designed to be in the form of a screw clamp or a spring clamp in a subsection. However, the holding elements do not have to have a fixation possibility, i.e., they can also have a design that is not in the form of screw clamp or a spring clamp. In particular, the holding elements can be designed merely as a compact structural unit in the form of a stand or base or they can be a component of a base plate or work plate.

In the holding elements, at least one bore is present, in which a bearing pin is arranged. The bore can here penetrate completely through the holding elements or else be designed as a blind hole. Via the bearing pins, in the case of at least two holding elements, at least one hoop is guided, which spans the work surface as frame element in the shape of an arc. In the shape of an arc in the present case means that the hoops are guided in the form of a semicircle toward the facing side of the support surface or via the bearing pins in the holding elements. The hoops here can be arranged so they are guided from one side to the other diagonally or offset. It is also possible to design the hoops as rectangular U-hoops. Which design is selected depends on the respective purpose of use and the possible designs of the work field.

On the holding elements, additional bores can be present, which are used for receiving fastening elements, fixation elements, adjustment elements and/or elastic adapters. Likewise, on the hoops, fastening elements, fixation elements, adjustment elements and/or elastic adapters can be arranged, which can be fastened with or without bores to the hoops by screw or clamp connection.

According to the invention, fastening elements are understood to mean, as examples but not exhaustively, operation tools or operation aids such as hooks, rods, clamps, needles, threads, springs and/or thread holders. On the holding elements and/or the hoops, fastening elements can be arranged directly.

Fixation elements are understood to mean a device component on which a fixation of an external material, for example, a thread for generating a surgical knot or a tissue preparation can be secured. Here, the fixation element can be designed, for example, in the form of a hook or an eyelet. The fixation elements can also be present, for example, as metal rods or rubber bands. The fixation elements can be connected or screwed via lateral bores in the area of the holding elements to said holding elements.

According to the invention, adjustment elements are understood to mean rail-like support elements which pass in the form of rails through the area of the support surface or of the work field. To these adjustment elements, fixation elements can be fastened according to the invention, which enable, along the rail-shaped surface of the support elements, an adjustment of the fixation elements on the holding elements after a movement, for example, by shifting. Thus it is possible to move or shift spring or clamp elements comprising, for example, sled-like attachments, on the adjustment elements in order to bring them into a desired position for a tissue preparation for a surgeon. For an improved possibility for fastening of a tissue preparation, these sled-like attachments can have ball joints, i.e., they are designed to be movable in order to make it possible to fasten a tissue preparation at a slanted angle. After positioning the fixation elements, they are held on the adjustment elements by means of screws.

The adjustment elements can be milled out as part of the material of the holding elements from said material as material component and have a rough surface structure in the form of fluting. This enables a step-like adjustment of the fixation elements on the adjustment elements. However, in a particular embodiment of the object of the invention, adjustment elements can also be fastened to the holding elements, for example, as insert.

It has been found that it is advantageous to fasten two or more hoops on holding elements, on which several fixation elements and/or fastening elements can be fastened. They include, for example, but not exhaustively, operation tools or operation aids such as hooks, rods, clamps, needles, threads, thread holders and/or screw clamps. By the arrangement of the fixation elements or fastening elements on the hoops, several operation tools or operation aids can be located in the work area. In a particular design of the object of the invention, it is possible that the fastening elements and/or fixation elements are fastened directly to the holding elements. A direct fastening can be advantageous particularly in the case of thread holders designed as shape elastic and/or shape-memory and shape-elastic, if, due to their size and their weight, they require a position-related stability. However, it is also possible to fasten thread holders to the fastening elements.

The fastening elements, fixation elements, adjustment elements and/or elastic adapters are guided advantageously via perforations in the hoops or fastened thereto. Here, according to the invention, perforations are intended to represent openings and/or holes with or without threading in the fastening elements. Into these perforations, which can be distributed completely over the hoops, fastening elements such as, for example, hooks, rods, clamps, needles, threads, thread holders and/or springs can be guided. It is also possible to insert individual fastening elements such as, for example, springs, via the hoops and to enable a stabilization of a tissue preparation in the work area. The fastening elements can here be guided by the perforations so that they are supported in a perforation of one hoop at one end or in the perforation of the same or of another hoop at another end, or so that the fastening elements are screwed or clamped in the perforations. The fastening elements enable the fixation of tissue preparations to that extent or are used as operation aids. Here, it is possible that the fastening elements are present only singularly, i.e., individually as operation tool or operation aid on the hoops and/or on the holding elements or arranged multiply on the hoops and/or on the holding elements.

In a particular design, the surgical simulation apparatus comprises a base plate and/or work plate as support surface or work field, comprising at least partially a recess. The recess can here be designed in such a manner that it comprises a flat material ablation in subsections of the base plate and/or work plate, i.e., it represents a flat material indentation at least in subsections. However, it is also possible that the recess in the base plate and/or work plate is designed as an opening. Here, as a rule, the recess is arranged in the center area of the base plate and/or of the work plate, and can be designed in the shape of a circle, oval, rectangle or polygon. In the area of the recess in a lateral bore, at least one fixation element can be arranged.

The fixation elements can be present, for example, in the area of the recess, also as metal rods or rubber bands and pass through the recess in a linear manner or fill the recess in subsections in a linear manner. The fixation elements can be connected or screwed via lateral bores in the area of the recess to the base plate and/or work plate. The bores can be designed as all the way through or in the manner of blind holes. However, it is also possible that the fixation elements are fastened via adjustment elements to the base plate and/or work plate.

The base plate and/or work plate can comprise a recess which is traversed in a rail-like manner or the recess can be filled with support elements in a linear manner. According to the invention, on the support elements, fixation elements can be fastened, which, along the rail-like surface of the support elements, enable an adjustment of the fixation elements on the base plate and/or work plate, after a movement, for example, by shifting. Thus, it is possible to move and to shift sled-like attachments on the adjustment elements, in order to bring them into a desired position for a tissue preparation for a surgeon. The sled-like attachments can have ball joints for an improved possibility for fastening of a tissue preparation, i.e., in order to be able to fasten a tissue preparation at a slanted angle. The sled-like attachments can comprise in particular clamps or screw clamps. After the positioning of the fixation elements, the fixation elements can be held on the adjustment elements with screws.

The adjustment elements can be milled out as part of the material of the base plate and/or the work plate from said material as a material component and have a rough surface structure in the form of fluting. This enables a step-like adjustment of the fixation elements on the adjustment elements. However, in a particular embodiment of the object of the invention, adjustment elements that were not part of the base plate or work plate can also be fastened to the base plate and/or work plate, for example, as an insert.

On the base plate and/or work plate, as well as on the holding elements, fastening elements can be arranged directly. In a particular embodiment, radially on the base plate, bores are located, which enable a screw, adhesion or plug connection of the base plate to the work plate, i.e., the work plate can be attached to the base plate via screws, rivets, magnets or bearing pins. Centrally in the center area of the work plate, a bore can be present, via which a stand can be fastened to the work plate. This stand is used in order to be able to variably adjust the surgical simulation apparatus in terms of height. The dimensions of the stand as a rule are ¼" or ⅜".

However, according to the invention it is also provided that the base plate and/or work plate can be used independently as individual base or support surface for a surgical simulation apparatus, i.e., that no fastening of the work plate to the base plate occurs and the base plate or work plate functions individually as support surface. All the above-mentioned fixation elements, fastening elements, adjustment elements and/or flexible adapters can be fastened to the base plate or work plate or be present thereon. For example, if the base plate alone is used as base or support surface, then the work plate does not necessarily have to be present or fastened as part of the surgical simulation apparatus on the base plate. The base plate alone can be used as support surface. In the same way, it is possible to use only the work plate as base or support surface. In this case, the work plate is rotated vertically by 180° and the screw/adhesion/plug connections of the work plate to the base plate can be used as holders or support elements, i.e., as legs for the work plate.

In an advantageous design of the object of the invention, the base plate and/or work plate is/are designed to be substantially circular. Substantially circular in the present case means that the base plate and/or work plate can be in the form of a circular disk, an oval or an ellipse. However, it is also possible that the design of the base plate and/or work plate is rectangular or polygonal. The advantage of a circular design is that the surgical simulation apparatus can be rotated without the possibility of the surgeon getting caught on the edges.

In another advantageous design, a protractor and/or a ruler is/are arranged between the holding elements. In the case of the design of the object of the invention with a base plate and/or work plate, the protractor and/or a ruler is/are arranged on the base plate and/or work plate. In all the above-mentioned cases, the ruler or the metric scale is used for measuring the length and/or the width of organs and tissues. This is particularly advantageous with regard to the development of visual judgment of the surgeon during an operation. Thus, a protractor can be arranged between the holding elements or on the radially outer side of the base plate and/or work plate, for example, in order to determine the position of vessels in vascular anastomoses.

In another advantageous design, the fastening and/or fixation elements are fastened via elastic adapters to the holding elements and/or the hoops or, in the case of the particular design of the object of the invention, they are fastened with base plate and/or work plate to them. The fastening of the fastening elements and/or fixation elements to the holding elements and/or the hoops or the base plate and/or the work plate can be necessary in order to ensure as much freedom of movement as possible for the surgeon in the area of the work field. Elastic adapters in the present case are understood to mean shape elastic, cylindrical carriers which enable a fastening of hooks, clamps, needles, threads, rubber bands, screw clamps, lasers and/or thread holders. In a particular design variant, the elastic adapters can be designed to be telescope-like, i.e., they can be designed as extendible and/or shape elastic. In particular, an extendible and/or shape elastic design can occur via a metal wire with adjustable tension, wherein the tension can be adjusted via a torsion element or a torsion movement. However, it is also conceivable to achieve an extendible and/or shape-elastic design with the aid of a shape-memory alloy.

An arrangement of the fastening and/or fixation elements via elastic adapters can be necessary, in particular in the case of lasers and/or thread holders which are to be arranged in certain areas above or next to the work field. Therefore, it is also conceivable that, on the elastic adapters themselves, which are fastened to the holding elements and/or to the hoops or the base plate and/or work plate, the fastening and/or fixation elements are fastened, and the elastic adapters are connected directly to the holding elements and/or to the hoops or the base plate and/or work plate. This is the case in particular when, for example, with the aid of lasers, an orientation of the surgeon with regard to an operation technique, in particular with a sectional drawing, is to take place and/or when an incision is to be carried out with the aid of the laser itself.

Furthermore, in an advantageous design, the object of the invention is provided with holders. According to the invention, holders are support elements on the underside of the holding elements or of the work plate and/or base plate, i.e., on the side facing away from the work field, in order to ensure a fixed positioning of the object of the invention on the support surface. In a certain design, the support elements can comprise at least three legs, advantageously four legs. The legs can be made of metal, rubber or a material such as, for example, metal with rubber coating, wherein the legs are connected via screws to the base plate. However, the screws themselves can also be used as leg-like holders. In a particularly advantageous design the screws as legs are themselves magnetic or contain magnets. However, in a particular design of the holders, it is also possible to use magnets and/or suction cups directly on the holding elements or the work plate and/or base plate. The support elements can be fastened individually to the holding elements or be put over the leg-like holders. Particularly on smooth surfaces such as, for example, wood tables, ceramic supports, suction cups prevent a slipping of the device according to the invention. Therefore, it is possible to prevent slipping by means of the suction effect of the suction cups alone. However, it is also possible for slipping of the object of the invention to occur due to the action of the leg-like magnetic holders, in particular on a metallic substrate, or due to the synergistic effect of suction cups and magnets together, which achieve a particularly strong connection to the substrate and prevent slipping, i.e., it is possible that magnets and suction cups can be used in combination.

The device according to the invention is used for medical training purposes and it promotes and improves surgical skill, operative methodology and the development of the visual judgment of the surgeon, which can be implemented in particular with isolated organ and tissue preparations. The convenient organ or tissue fixation is made possible by the described construction of this invention and the associated components. In particular, the field of application for training purposes extends to fields such as surgical knotting, cutting techniques using laser orientation and ruler with metric scale, skin sutures, suturing of drains, heart-thorax surgery, aorta surgery, coronary artery bypasses, valve surgery, bronchial anastomoses, esophageal anastomoses, minimally invasive valve surgery, replacement of the ascending aorta, vascular surgery, vascular anastomoses of all types, in particular without assistants, intestinal anastomoses, plastic and aesthetic surgery in particular decortication with cutting techniques, microsurgery, in particular microanastomoses, gynecology, urology, trauma surgery, neurosurgery, eye surgery, veterinary medicine in surgical fields, wherein animals or animal preparations can also be used.

The invention is described again in detail in reference to the following figures:

FIG. 1 shows a surgical simulation apparatus (1) in a diagrammatic view. Four holding elements (19) can be seen, which are arranged with mutual offset by approximately 90°. The holding elements (19) are designed to be c-shaped and they comprise bores (5), i.e., they can be fastened to a support surface (17) with the aid of screws which are guided through the bores. Furthermore, on the holding elements, bores (5) are present, wherein a bearing pin (6) is arranged in each bore for a hoop (7) in each holding element (19) via which the hoops (7) are guided. Each hoop (7) is designed as curved and spans the support surface (17) which spans a/the work field (8) generated under the curved hoop (7). The work field (8) is delimited radially by the holding elements (19) and by the area which can be generated by coaxial movement or swiveling of at least one hoop (7) along a circular line. Moreover, it can be seen that the hoops (7) comprise perforations (10) through which the fastening elements (9), fixation elements (18), adjustment elements (4) and/or adapters (14) can be guided.

Figure 2:
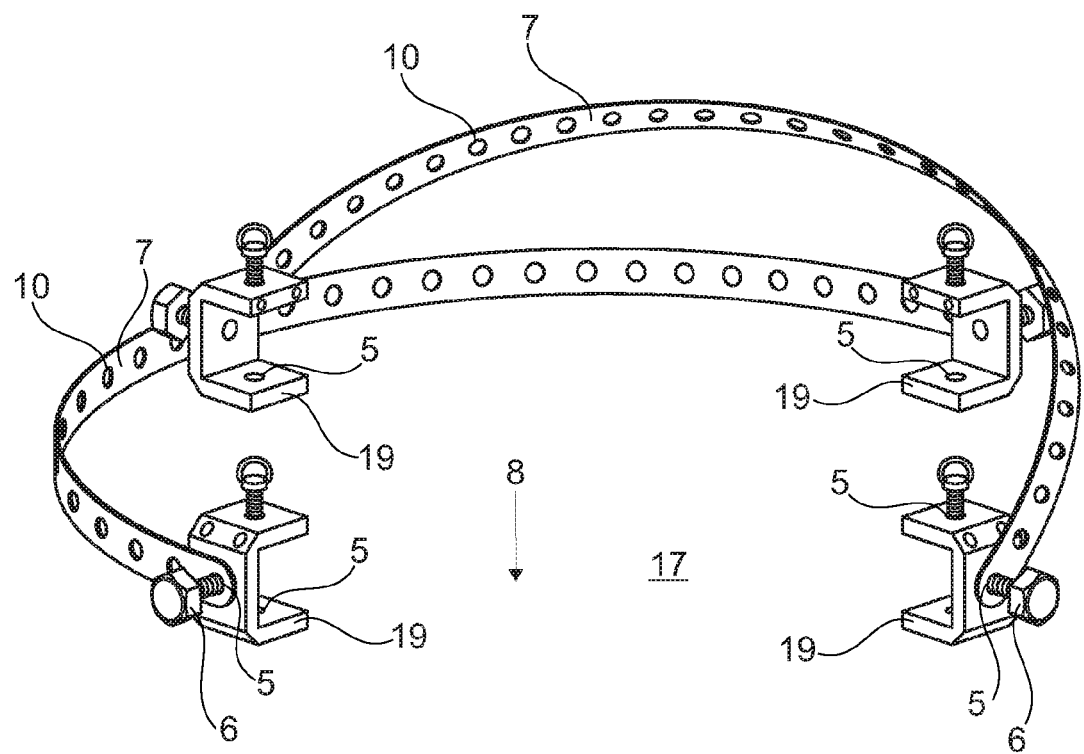

In FIG. 2, a surgical simulation apparatus (1) is represented in a diagrammatic view analogous to FIG. 1, wherein the hoops (7) are rotated around the bearing pins (6) so that they lie in a plane with the support surface (17) or the work field (8).

Figure 3:
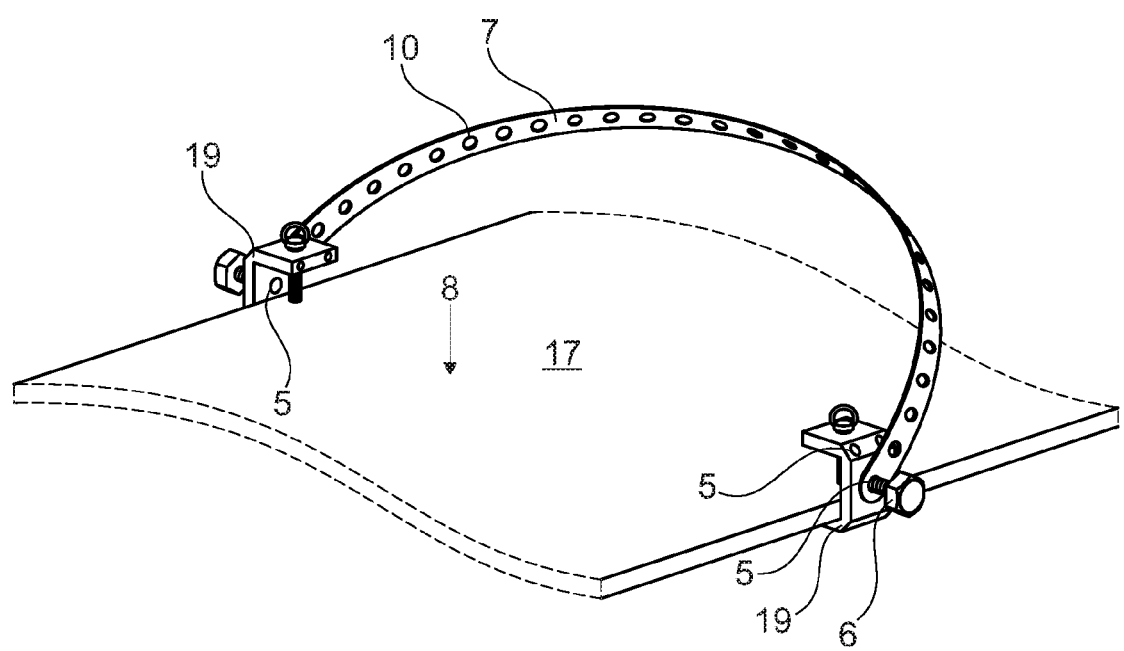

From FIG. 3, it can be seen how, on any support surface (17), holding elements (19) are fastened with screws. Due to the diagonal or diametric arrangement of the holding elements (19) on the support surface (17), the support surface (17) can be spanned, wherein the perforated hoop (7) is guided via bearing pins (6) in the holding elements (19). In the present case, the hoop (7) is rotated so that the hoop (7) lies in a plane with the support surface (17) or the work field (8). Through the perforations (10) of the hoop (7), fastening elements (9), fixation elements (18), adjustment elements (4) and/or adapters (14) can be guided.

Figure 4:
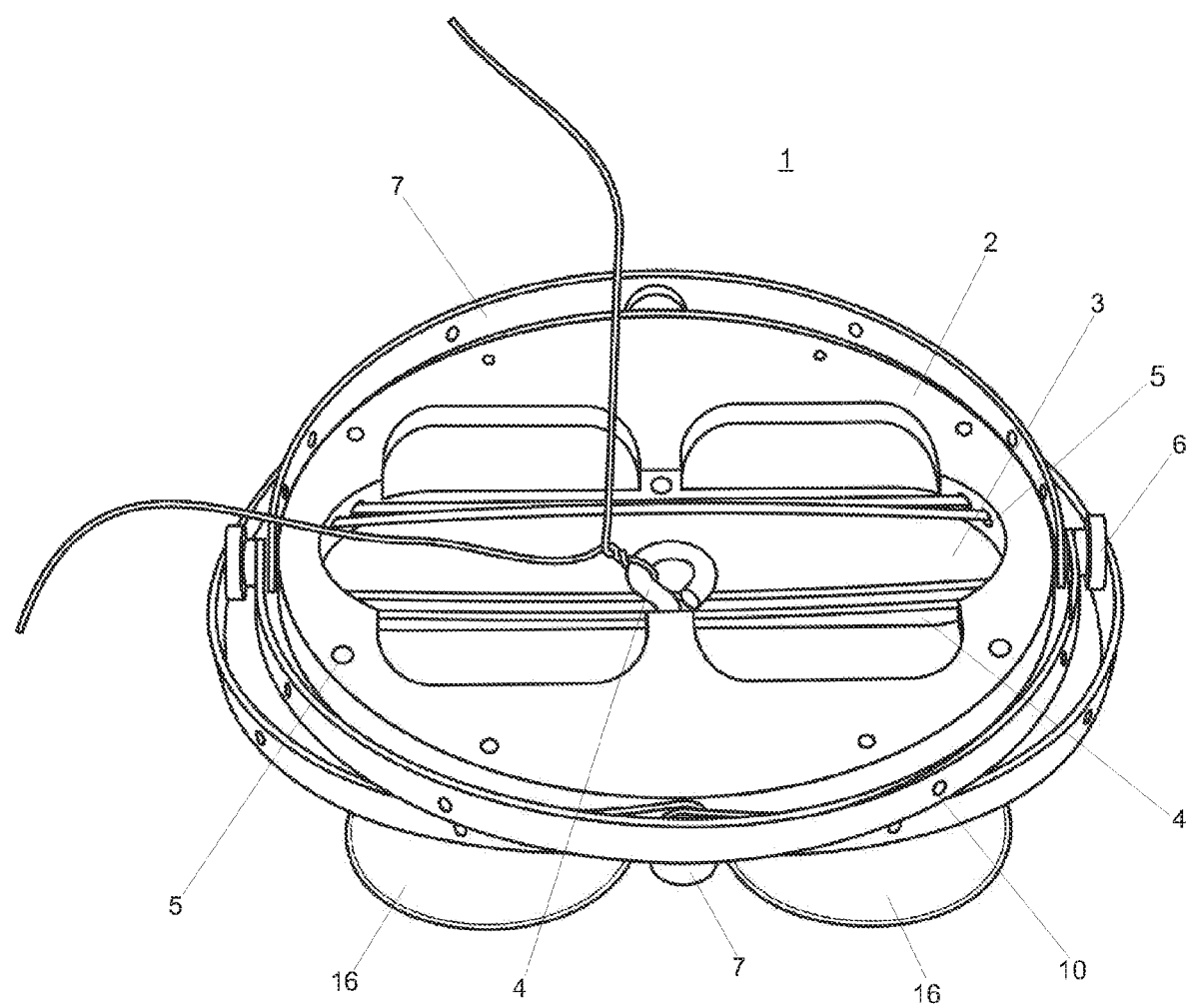

FIG. 4 shows a surgical simulation apparatus (1) in a perspective view. One can see a circular base plate (2) with a recess (3) arranged substantially centrally, in which a hook- or eyelet-shaped fixation element (4) is arranged. In the area of the recess (3), there are additional fixation elements (4) which in the present case, can represent, for example, metal rods or rubber bands, and which pass through the recess (3) in a linear manner or fill the recess (3) in subsections in a linear manner. On the fixation elements (4), for example, surgical knots or tissue preparations can be fastened, which, in the present case, is represented by the fastening of a thread with knots on the hook- or eyelet-shaped fixation element (4). The fixation elements (4) can be connected via lateral bores (5) in the area of the recess (3)

to the base plate (2), for example, by being clamped or screwed to the base plate (2). The bores (5) can here be designed as all the way through or in the manner of blind holes. Moreover, laterally, on the base plate (2), four sites with bores (not represented) are located, which are used for receiving bearing pins (6) via which the hoops (7) are guided. The hoops (7) are stuck on coaxially via bearing pins (6), wherein the bearing pins (6) face one another diametrically. In the present case, the ends of the semicircular hoops (7) are arranged concentrically around the circular base plate (2), i.e., the hoops (7) are not set up and thus do not cover the work field (not represented). The hoops (7) are designed as semicircular arcs, the ends of which are stuck via perforations (10) of the hoops (7) onto the bearing pin (6). Furthermore, it can be seen that, radially on the base plate (2), bores (5) are present, which enable a screw, magnet or plug connection of the base plate (2) to a work plate (11). Finally, on the side facing away from the base plate (2) and/or work plate (11), holders (not represented) are present, which ensure a fixed positioning of the object of the invention on a substrate. The holders can have legs, for example, three, advantageously four legs. The legs can be made of rubber or of a material such as, for example, metal with rubber coating, wherein the legs are connected via screws to the base plate (2). In the present case, suction cups (16) can be seen. These suctions cups (16) are put over the leg-like holders and, in particular on smooth surfaces such as, for example, wood tables, ceramic supports or metal tables, prevent a slipping of the surgical simulation apparatus (1) during use. The holders can be designed with magnets or magnetically. The suction cups (16) can in addition be put over the holders for improved stability.

Figure 5:
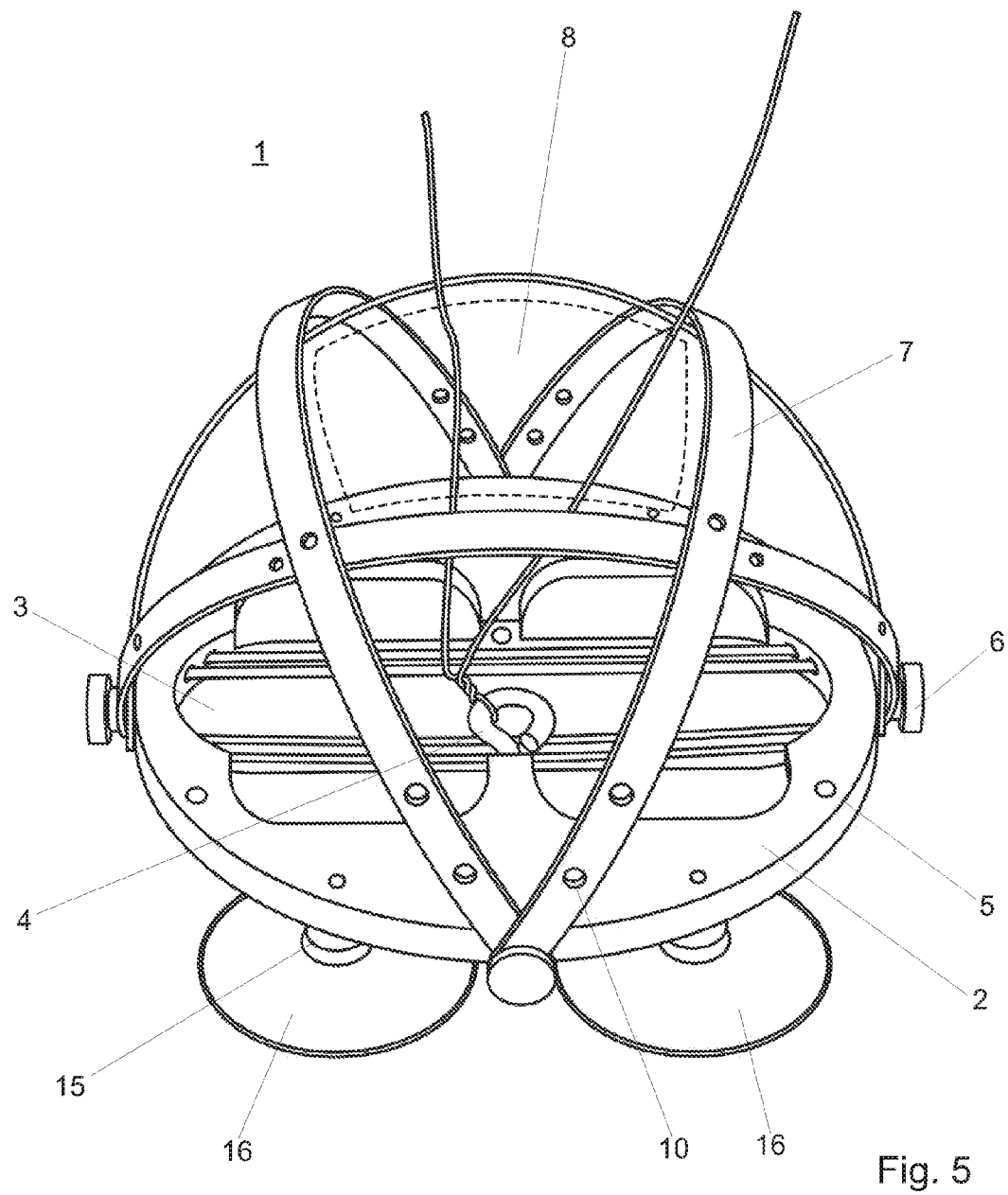

In FIG. 5, one can see a surgical simulation apparatus (1) in a perspective view analogous to FIG. 1, wherein the hoops (7) are folded open around the base plate (2) and cover the work field (8). Via perforations (10) on the hoops (7), the ends of the hoops (7) are guided coaxially via bearing pins (6), wherein the bearing pins (6) face one another diametrically. By a swiveling movement of the hoops (7), the area of the base plate (2) with or without work plate (11) is covered at least partially by the hoops (7). In the present case, four semicircular hoops (7) are guided via four bearing pins (6) which face one another diagonally, so that the work area of the work field (8) can be varied in size by swiveling the hoops (7), i.e., the work area can be increased or decreased. By the arrangement and swiveling of four hoops (7) in the same direction toward the middle of the base plate (2), the work field (8) is delimited by the trapezoidal area spanned by the hoops (7). Furthermore, on the side of the base plate (2) facing away from the work field (8), one can see holders (15) via which the suction cups (16) are led.

Figure 6:
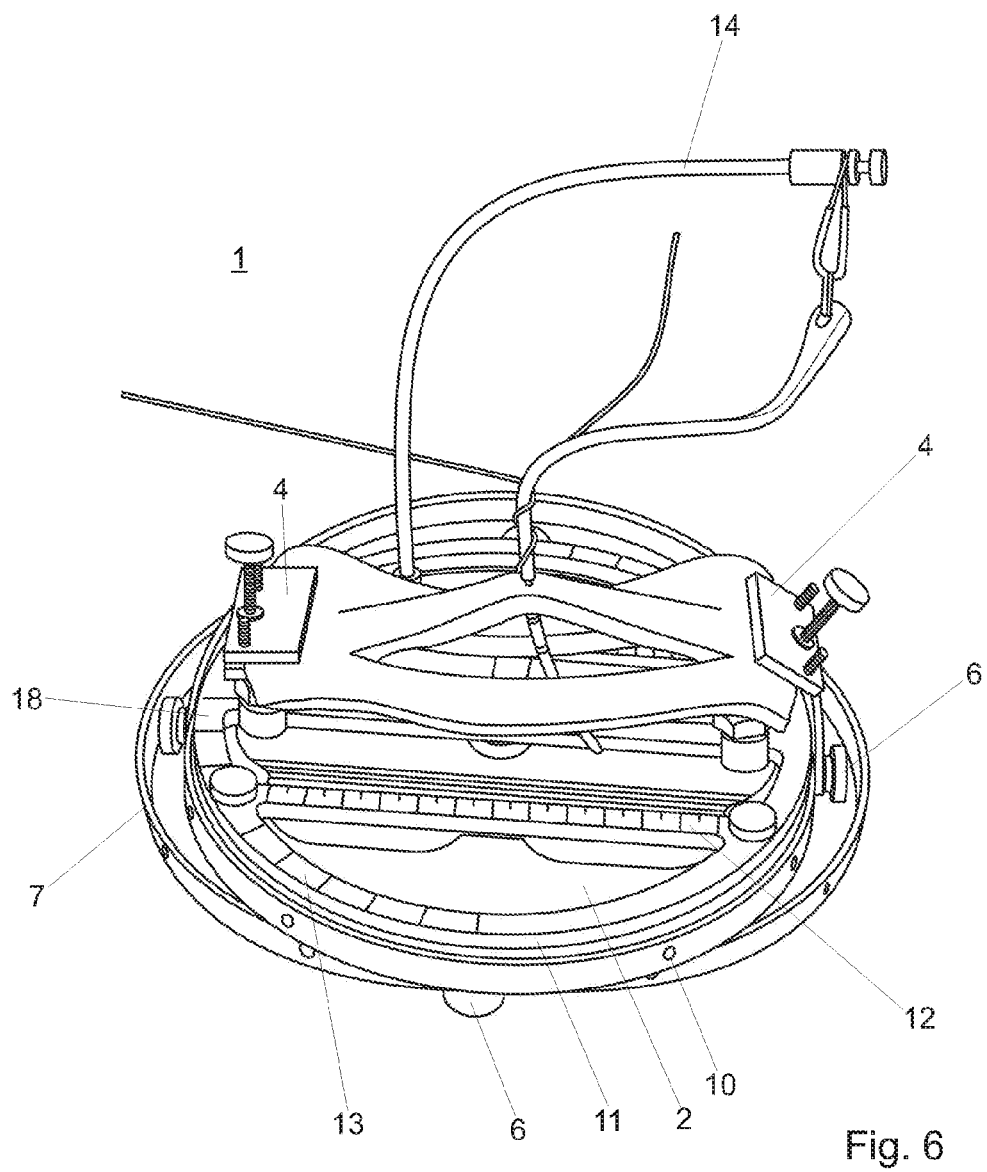

FIG. 6 shows a surgical simulation apparatus (1) in a perspective view, in which the base plate (2) is connected to a work plate (11). The connection of the work plate (11) to the base plate (2) occurs via screw, magnetic or plug elements such as screws, bearing pins (6), magnets or rivets which are introduced into bores (not represented) of the base plate (2) and work plate (11). As can be seen, the work plate (11) has a protractor (13) and/or a ruler (12). The ruler (12) or the metric scale is used for measuring the length and the width of organs and tissues. The protractor (13) on the radial outer side of the work plate (11) is used, for example, for determining the position of vessels in vascular anastomoses. Moreover, in FIG. 3, one can see hoops (7) which are stuck on coaxially via bearing pins (6), wherein the ends of the semicircular hoops (7) are arranged concentrically around the circular base plate (2), i.e., the hoops (7) are not set up and do not cover the work field (not represented) of the base plate (2) and/or work plate (11). Furthermore, in the center area of the work plate (11), one can see the arrangement of fixation elements (4). As fixation elements (4), in the present case two end-side screw clamps are used, which are fastened to adjustment elements (18). The fixation elements (4) can be used, on the one hand, to perform on them a fixation of an external material, for example, of a thread, as surgical knot or else for fastening a tissue preparation, wherein the fixation elements (4) can be arranged on the base plate (2) or in the area of the recess (3) of the base plate (2) or on the work plate (11) via adjustment elements (18). Furthermore, elastic adapters (14) are attached to the base plate (2) and/or work plate (11). In the present case, FIG. 3 shows a shape elastic, cylindrical adapter (14) to which a karabiner with a bendable drain dummy is attached and around which a thread is pulled.

Figure 7:
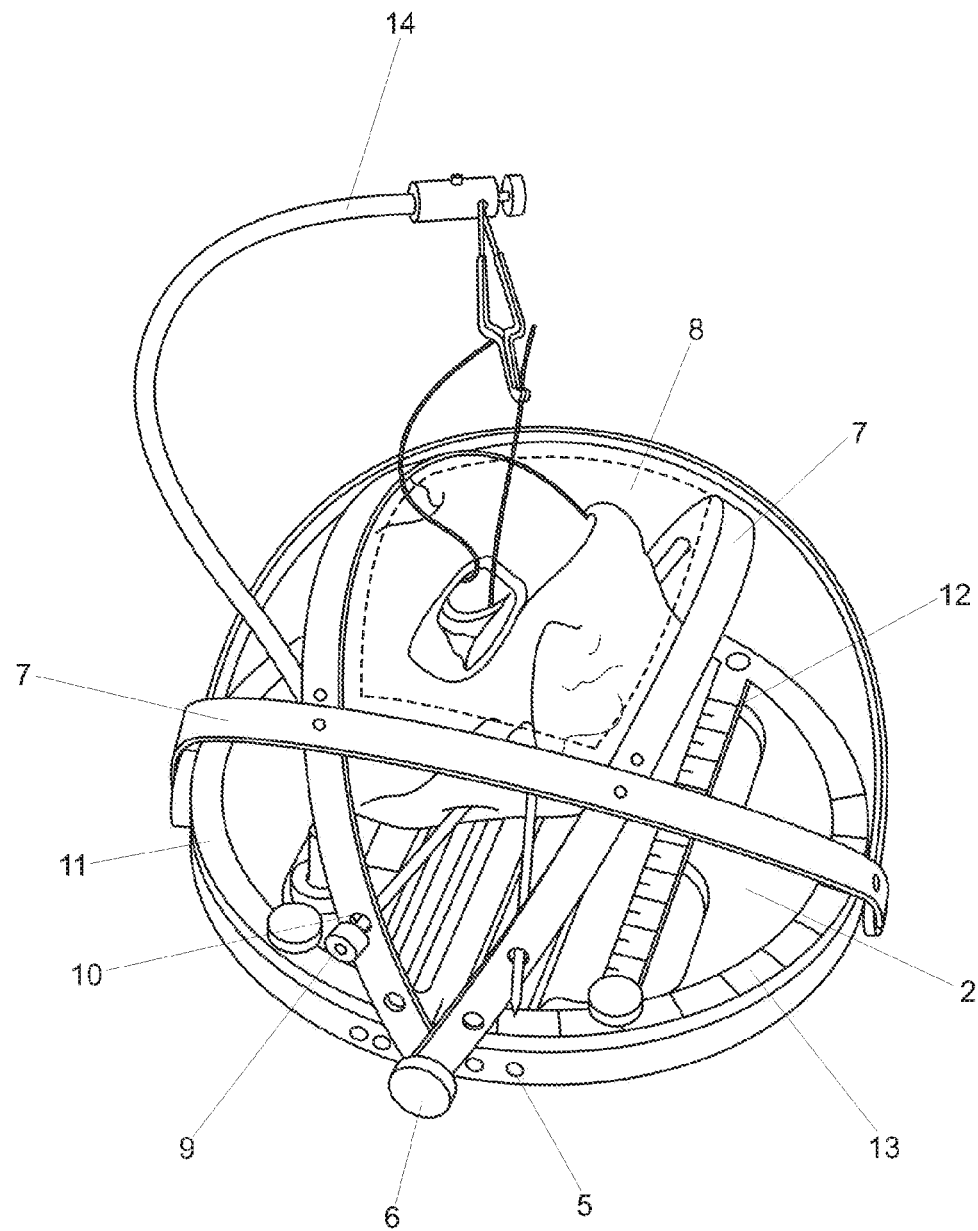

FIG. 7 discloses a surgical stimulation apparatus (1) in a perspective view analogous to FIG. 3, wherein the hoops (7) are folded open and cover the work field (8) in the shape of an arc. In perforations (10) on the hoops (7), fastening elements (9) in the form of rods are guided, which carry a diagrammatically indicated tissue preparation. By means of a pivoting movement of the hoops (7), the area of the base plate (2) with or without work plate (11) is covered at least partially by the hoops (7). In the present case, four semicircular hoops (7) are guided via four mutually diagonally facing bearing pins (6), so that the work area of the work field (8) is delimited by the trapezoid area spanned by the four hoops (7). Furthermore, one can see an elastic adapter (14) which is fastened to the base plate (2) and/or work plate (11) and to which a karabiner with a thread is fastened, wherein the suturing of an auxiliary object during an operation, such as, for example, a drain, or the suturing of a subsection of a tissue preparation is represented.

Figure 8:
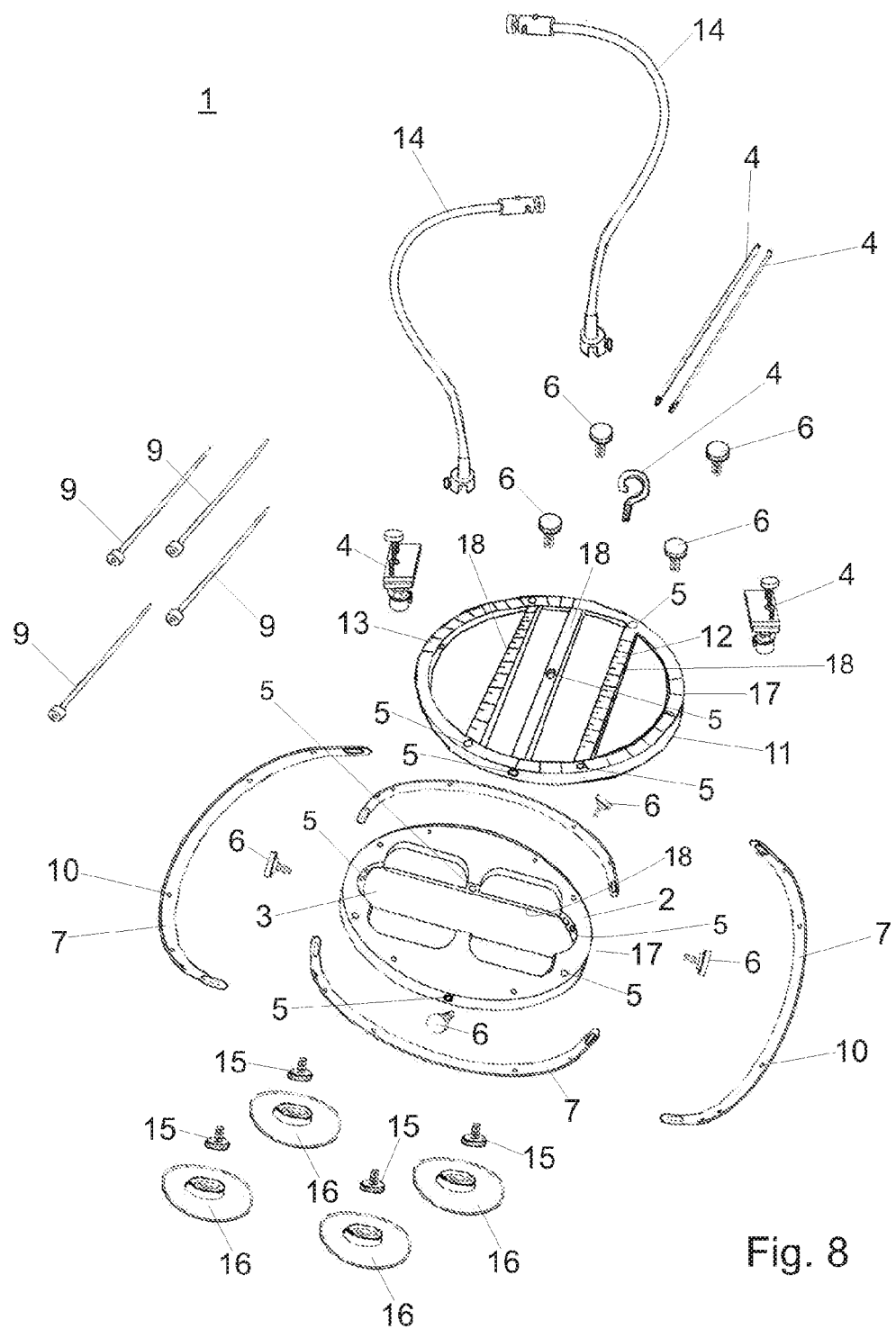

In FIG. 8, a surgical simulation apparatus (1) is represented in an exploded view. In the center area of the figure, one can see a circular base plate (2) and a circular work plate (11) with lateral bores (5), on which hoops (7) can be fastened with screws, rivets or bearing pins (6). One can also see a hook or eyelet-shaped fixation element (4) which can be arranged in a recess (3) of the base plate (2) in a central bore (5). In the area of the recess (3), additional fixation elements (4) can be located, which can represent, for example, metal rods or rubber bands, and which are guided or fastened in lateral bores (5) in the area of the recess (3) and which can pass through the recesses (3) in a linear manner or fill the recess (3) in subsections in a linear manner. On the fixation elements (4), for example, surgical knots can be simulated, which can occur by means of the fastening of a thread with knots on the hook or eyelet-shaped fixation element (4). The above-mentioned fixation elements (4) can also be fastened in radial bores (5) of the work plate (11). In the center area of the work plate (11), additional bores (5) are located, in which a stand-like device can be introduced and via which the surgical simulation apparatus (1) can be variably adjusted in terms of the height. Such a stand-like device as a rule measures ¼" or ⅜".

Furthermore, in the center area of FIG. 8 fixation elements (4) which are designed as screw clamps can be seen. The fixation elements (4) can be fastened via adjustment elements (18) to the base plate (2) and/or work plate (11). The fixation elements (4) can be fastened along the rail-like or linear surface of the adjustment elements (18) and they enable a movement along the adjustment elements (18) on the base plate (2) and/or work plate (11), until they are in a desired position for the surgeon. After positioning of the fixation elements (4), they are fastened to the adjustment elements (18) with screws.

The adjustment elements (18) can be milled out as part of the material of the base plate (2) and/or of the work plate (11) from said material as material component and have a rough surface structure in the form of fluting. This enables a step-like adjustment of the fixation elements (4) on the adjustment elements (18). However, in a particular embodiment of the object of the invention, it is also possible to fasten adjustment elements (18) which were or are not part of the base plate (2) or work plate (11) to the base plate (2) and/or work plate (11). Here, the base plate (2) and/or work plate (11) can have a protractor (13) and/or a ruler (12).

Moreover, one can see that four hoops (7) can be fastened with the aid of four bearing pins (6) to the base plate (2) or the work plate (11). It is also possible that, due to the lateral arrangement of the semicircular hoops (7) around the circular base plate (2) or work plate (11), when the hoops (7) are moved by 45° around the bearing pins (6) toward the center of the base plate (2) or work plate (11), a trapezoidal work field (not drawn in) is spanned. The hoops (7) delimit the work field which is delimited by the four hoops (7), wherein the hoops (7) span the base plate (2) and/or work plate (11) in the shape of an arc.

By means of the hoops (7), fastening elements (9) can be guided, which, in the present case, are represented in form of rods. The fastening elements (9) are advantageously guided via perforations (10) in the hoops (7) and fastened thereto. Perforations (10) here are intended to represent according to the invention openings and/or holes with or without threading in the fastening elements (9). Into these perforations (10), which can be distributed completely over the hoops (7), fastening elements (9), such as, for example, hooks, rods, clamps, needles, threads, thread holders and/or springs can be guided. The fastening elements (9) can here be guided through the perforations (10), so that they lie, at one end, in a perforation (10) of one hoop (7) and, at the other end, in the perforation (10) of the same or of another hoop (7) or so that the fastening elements (9) are screwed in the perforations (10).

In the upper area of FIG. 8, elastic adapters (14) can be seen. The elastic adapters (14), as shape elastic, cylindrical carriers, enable a fastening of hooks, clamps, needles, threads, rubber bands, screw clamps, lasers and/or thread holders. The elastic adapters (14) can have a telescope-like design in a particular embodiment variant, i.e., they can be designed as extendible and/or shape elastic. It can be necessary to fasten the elastic adapters (14) to the fastening elements (9) and/or fixation elements (4), in particular in the case of lasers and/or thread holders, since this can be used to achieve an improved view and operation management in certain areas above or next to the work field (not represented). However, it is also possible to fasten the elastic adapters (14) themselves to the base plate (2) and/or work plate (11) and to arrange fastening elements (9) and/or fixation elements (4) thereon.

Radially on the base plate (2), bores (5) are located, via which a screw, magnet or plug connection of the base plate (2) to the work plate (11) is possible, i.e., via screws, rivets, magnets or bearing pins (6), the work plate (11) can be fastened to the base plate (2) and thus form a support surface (17). However, according to the invention, it is also provided that the base plate (2) and/or work plate (11) can be used independently as individual base or support surface (17) for a surgical simulation apparatus (1), i.e., that no fastening of the work plate (11) on the base plate (2) occurs and the base plate (2) or work plate (11) individually functions as base or support surface (17). All the fixation elements (4), fastening elements (9), adjustment elements (18) and/or flexible adapters (14) mentioned in the present application can be fastened to the base plate (2) or work plate (11). For example, when only the base plate (2) is used as base or support surface (17), then the work plate (11) does not necessarily have to be present or fastened as part of the surgical simulation apparatus (1) on the base plate (2). The base plate (2) alone can be used as support surface. In the same way, it is possible to use only the work plate (11) as base or support surface (17). In this case, the work plate (2) is rotated vertically by 180° and the screw/plug/magnet connections or bearing pins (6) for the connection of the work plate (11) to the base plate (2) are used as holders (15), i.e., legs for the work plate (11).

In the lower area of FIG. 8, on the side facing away from the base plate (2) and/or work plate (11), holders (15) are present, which ensure a fixed positioning of the object of the invention on a substrate. The holders (15) in the present case comprise four legs, wherein the legs are made of rubber or of a material such as, for example, metal with rubber coating, and wherein the legs can be connected via magnetic screws or screws with magnets to the base plate (2) and/or work plate (11). In the present case, for the holders (15), suction cups (16) can also be seen. These suction cups (16) are put over the leg-like holders (15) and, in particular on smooth surfaces such as, for example, wood tables, ceramic supports or metal tables, they prevent a slipping of the surgical simulation apparatus (1) during use. The suction cups (16) can be put over the holders (15) for improved stability, wherein the holders (15) themselves can be designed to be magnetic or with magnets.

LIST OF REFERENCE NUMERALS

1 Surgical simulation apparatus
2 Base plate
3 Recess
4 Fixation element
5 Bores
6 Bearing pins
7 Hoops
8 Work field
9 Fastening elements
10 Perforation
11 Work plate
12 Ruler
13 Protractor
14 Adapter
15 Holders
16 Suction cups
17 Support surface
18 Adjustment elements
19 Holding elements

The invention claimed is:
1. A surgical simulation apparatus comprising
at least two holding elements on a support surface, wherein, laterally on the holding elements, at least one site, a bore for receiving a bearing pin is present, and coaxially to the bearing pin which extends on a circular like line around the support surface, at least one hoop is arranged, wherein, due to a coaxial movement of the hoop around the circular like line, the support surface can be spanned in the form of an arc,
wherein, by moving the hoop as frame element on the holding elements, a work field of variable size can be adjusted.

2. The surgical simulation apparatus according to claim 1, wherein on the holding elements, fastening elements, fixation elements, adjustment elements and elastic adapters are arranged.

3. The surgical simulation apparatus according to claim 1, wherein the support surface comprises a base plate.

4. The surgical simulation apparatus according to claim 1, wherein the support surface comprises a work plate.

5. A surgical simulation apparatus comprising at least two holding elements on a support surface, wherein, laterally on the holding elements, at least one site, a bore for receiving a bearing pin is present, and coaxially to the bearing pin which extends on a circular like line around the support surface, at least one hoop is arranged, wherein, due to a coaxial movement of the hoop around the circular like line, the support surface can be spanned in the form of an arc, wherein at least one hoop comprises at least in subsections openings, in which fastening elements, fixation elements, adjustment elements and elastic adapters are arranged.

6. The surgical simulation apparatus according to claim 5, wherein the support surface comprises a base plate, a work plate, a recess as flat indentation, wherein, in the recess, in subsections, fastening elements, fixation elements and adjustment elements are arranged.

7. The surgical simulation apparatus according to claim 5, wherein the support surface comprises a base plate, a work plate, a recess as an opening in the base plate and the work plate, wherein, in the recess, in subsections, fastening elements, fixation elements and adjustment elements are arranged.

8. The surgical simulation apparatus according to claim 5 wherein independently from each other on the holding elements and the base plate and the work plate, a ruler is arranged.

9. The surgical simulation apparatus according to claim 5 wherein independently from each other on the holding elements and the base plate and the work plate, a protractor is arranged.

10. The surgical simulation apparatus according to claim 5, wherein the fastening elements and fixation elements comprise rods, hooks, clamps, needles, threads, rubber bands, thread holders, springs and screw clamps.

11. The surgical simulation apparatus according to claim 5, wherein elastic adapters are fastened to the holding elements.

12. The surgical simulation apparatus according to claim 5, wherein elastic adapters are fastened to the hoops.

13. The surgical simulation apparatus according to claim 5, wherein elastic adapters are fastened to the base plate.

14. The surgical simulation apparatus according to claim 5, wherein elastic adapters are fastened to the work plate.

15. The surgical simulation apparatus according to claim 5, wherein the holding elements comprise holders and the holders comprise suction cups with adapters for the magnetic feet.

16. The surgical simulation apparatus according to claim 5, wherein the holding elements are a receiving base for the fastening elements, fixation elements adjustment elements and elastic adapters.

17. The surgical simulation apparatus according to claim 5, wherein the holding elements, the base plate, the work plate, the fastening elements, fixation elements, adjustment elements and elastic adapters consist of plastic.

* * * * *